United States Patent
Bachmann et al.

(10) Patent No.: US 10,560,407 B2
(45) Date of Patent: Feb. 11, 2020

(54) PAYLOAD DESCRIPTION FOR COMPUTER MESSAGING

(71) Applicant: SAP SE, Walldorf (DE)

(72) Inventors: Martin Bachmann, Heidelberg (DE); Andreas Hoffner, Ostringen (DE)

(73) Assignee: SAP SE, Walldorf (DE)

( * ) Notice: Subject to any disclaimer, the term of this patent is extended or adjusted under 35 U.S.C. 154(b) by 289 days.

(21) Appl. No.: 15/287,571

(22) Filed: Oct. 6, 2016

(65) Prior Publication Data

US 2018/0102997 A1 Apr. 12, 2018

(51) Int. Cl.
*H04L 12/58* (2006.01)
*H04L 29/08* (2006.01)
*H04L 29/06* (2006.01)

(52) U.S. Cl.
CPC .......... *H04L 51/08* (2013.01); *H04L 67/2809* (2013.01); *H04L 51/14* (2013.01); *H04L 67/02* (2013.01); *H04L 69/22* (2013.01)

(58) Field of Classification Search
CPC ..... H04L 51/08; H04L 67/2809; H04L 67/02; H04L 69/22
See application file for complete search history.

(56) References Cited

U.S. PATENT DOCUMENTS

| | | | | |
|---|---|---|---|---|
| 7,143,187 B1 * | 11/2006 | Takeda | ..................... | H04L 29/06 709/245 |
| 8,019,892 B2 * | 9/2011 | Shenfield | .............. | G06F 16/951 709/246 |
| 8,024,452 B2 * | 9/2011 | Shenfield | ............ | H04L 67/2847 709/224 |
| 8,171,120 B1 * | 5/2012 | Muhanna | ............... | H04W 8/082 709/221 |
| 8,284,845 B1 * | 10/2012 | Kovacevic | ......... | H04N 21/4305 370/389 |
| 8,867,340 B2 * | 10/2014 | Zriny | ...................... | H04L 1/005 370/229 |
| 9,300,579 B2 * | 3/2016 | Frost | ....................... | H04L 45/74 |
| 2002/0181471 A1 * | 12/2002 | Panico | ................ | H04L 12/5601 370/395.42 |
| 2006/0200456 A1 * | 9/2006 | Zohar | ................... | H04L 67/322 |
| 2006/0206348 A1 * | 9/2006 | Chen | ...................... | G06Q 10/06 705/7.11 |
| 2007/0073853 A1 * | 3/2007 | Azizi | .................... | G06F 16/283 709/220 |
| 2007/0217407 A1 * | 9/2007 | Yuan | ................. | H04L 29/06027 370/389 |
| 2008/0175251 A1 * | 7/2008 | Oouchi | ................... | H04L 12/66 370/395.31 |

(Continued)

*Primary Examiner* — Uzma Alam
(74) *Attorney, Agent, or Firm* — Schwegman Lundberg & Woessner, P.A.

(57) ABSTRACT

Various examples are directed to methods and systems for describing message payload data in computer messaging. A messaging client may receive a first message that comprises first payload data. The messaging client may identify from the first message a first metadata identifier data and send a metadata request to a metadata source indicated by the first metadata identifier data. The messaging client may receive from the metadata source first payload metadata describing the first payload data. The messaging client may identify a first payload record from the first payload data based at least in party on the first payload metadata.

20 Claims, 8 Drawing Sheets

(56) References Cited

U.S. PATENT DOCUMENTS

| | | | | |
|---|---|---|---|---|
| 2009/0007188 A1* | 1/2009 | Omernick | H04N 21/2402 | 725/62 |
| 2010/0274772 A1* | 10/2010 | Samuels | G06F 16/1748 | 707/693 |
| 2014/0022894 A1* | 1/2014 | Oikawa | H04L 12/462 | 370/229 |
| 2014/0143414 A1* | 5/2014 | Deng | H04L 43/04 | 709/224 |
| 2014/0379931 A1* | 12/2014 | Gaviria | H04L 65/1016 | 709/227 |
| 2015/0227406 A1* | 8/2015 | Jan | G06F 11/079 | 714/37 |
| 2016/0036730 A1* | 2/2016 | Kutscher | H04L 45/38 | 370/401 |
| 2017/0019463 A1* | 1/2017 | Tsunoda | H04L 67/104 | |
| 2017/0041223 A1* | 2/2017 | Akashi | H04L 61/103 | |
| 2017/0078359 A1* | 3/2017 | Herrero | H04L 63/0428 | |
| 2018/0067876 A1* | 3/2018 | Deshpande | H04N 21/435 | |

\* cited by examiner

PAYLOAD DESCRIPTION FOR COMPUTER MESSAGING

TECHNICAL FIELD

This document generally relates to methods and systems for use with computer devices, including networked computing devices. More particularly, this document relates to systems and methods for efficiently labeling and interpreting payload data included in computer messages.

BACKGROUND

Computer messaging is concerned with routing data in the form of messages from one or more messaging clients (sending clients) to one or more other messaging clients (receiving clients). Various different protocols are used to convert data into one or more messages (e.g., application layer protocols), to define the syntax of a message (e.g., wire protocols), and to route messages from a sending client to a receiving client (e.g., transport layer protocols).

Application layer protocols, such as Hypertext Transport Protocol (HTTP), MQ Telemetry Transport (MQTT), Advanced Message Queueing Protocol (AMQP), etc., are used to prepare data from various computer applications into one or more messages for transmission over a network and to convert received data to messages consumable by computer applications. Message syntax is determined according to one or more wire protocols, such as eXtensible Markup Language (XML), Java Script Object Notation (JSON), etc. Transport layer protocols, such as Transmission Control Protocol/Internet Protocol (TCP/IP) provide standards for converting messages to a set of data packets, routing the data packets to the appropriate receiving client or clients, and reconstructing the message from received data packets. For example, the TCP protocol provides standards for converting a message to data packets and for reconstructing the data packets into the original message. The IP protocol provides standards for addressing data packets to the appropriate receiving client or clients.

BRIEF DESCRIPTION OF DRAWINGS

The present disclosure is illustrated by way of example and not limitation in the following figures.

DETAILED DESCRIPTION

Figure 1:
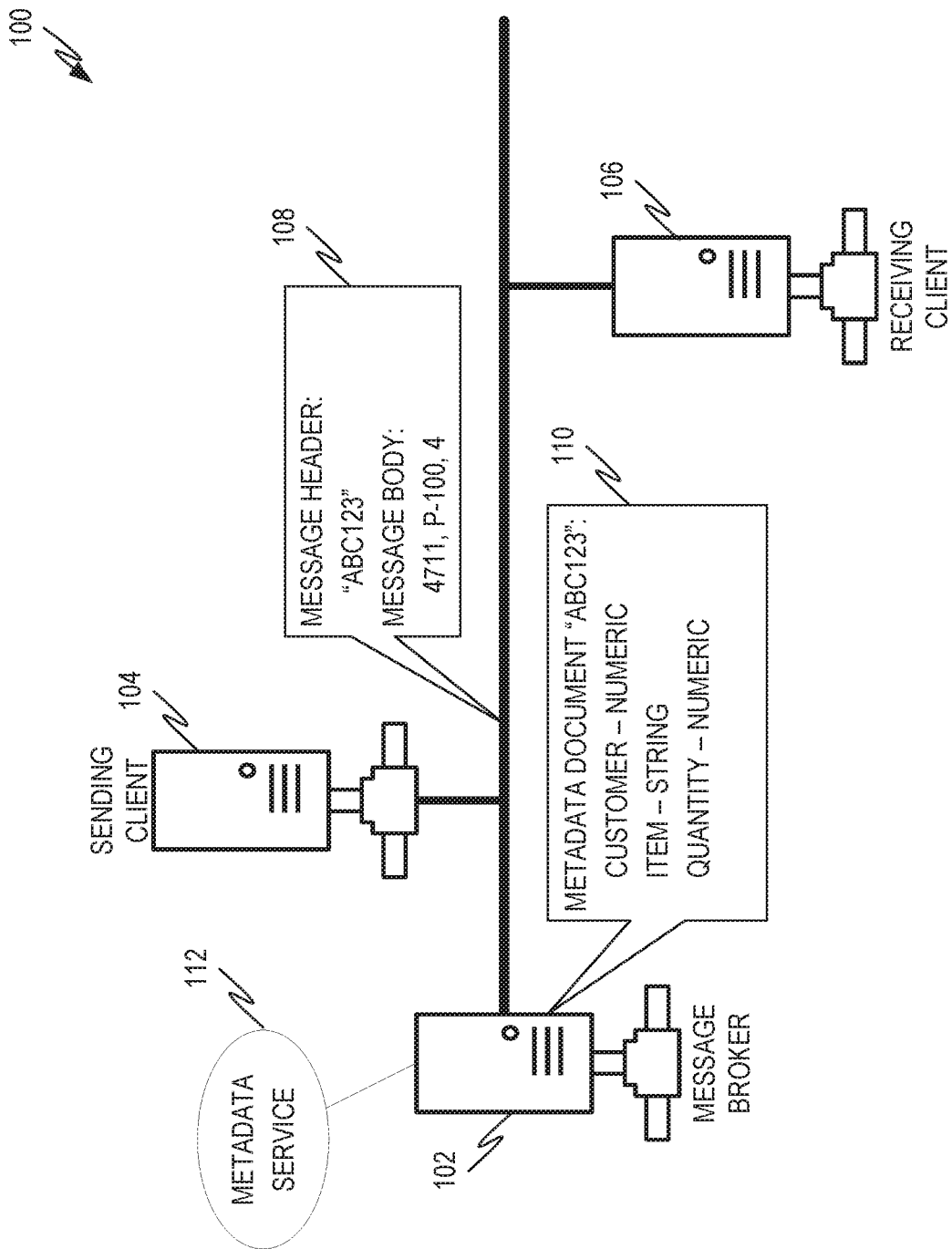
FIG. 1 is a diagram showing one example of an environment for describing message payload data.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques have not been shown in detail.

Various examples described herein are directed to systems and methods for describing payload data in messages sent or to be sent between messaging clients. A message may include a metadata identifier data, for example, as part of a header of the message or embedded in the payload data itself. The metadata identifier data may reference a service or other source that can provide payload metadata describing the payload data of the message. A receiving client that receives the message may query the metadata source to receive the payload metadata and may use the payload metadata to parse and/or otherwise process the payload data.

In some examples, the payload metadata describes the payload data according to a standard data format, such as a version of the OData format maintained by the Organization for the Advancement of Structured Information Standards (OASIS). For example, the metadata source may be or include an OData service. The receiving client, in some examples, maintains the payload metadata at a metadata cache. When the receiving client receives subsequent messages having the same metadata identifier data as a previously-received message, it may retrieve the appropriate payload metadata from its metadata cache instead of again querying the metadata source.

The systems and methods described herein may provide various benefits and advantages. For example, because the payload metadata is accessible from information included in the message itself, it may reduce or eliminate the need for messaging clients to pre-negotiate the structure of payload data. Also, because the full payload metadata is not included in each message, it may reduce the size of the messages and, therefore, reduce the network bandwidth used to send messages. These and other advantages will be apparent to one having ordinary skill in the art.

Payload data is information that is to be transferred from one messaging client (e.g., a sending client) to another messaging client (e.g., a receiving client). Payload data may include any type of information or data that can be transferred from a sending client to a receiving client. Payload data may be of different types and organized in different ways depending on the application. Several examples of messaging clients and payload data are provided herein and used to illustrate systems and methods for describing payload data. Although these examples may illustrate particular features and advantages, the systems and methods described herein are not limited to these examples and may be generally applied to any suitable messages and payload data.

In one example, messaging clients may include a database management system (DBMS) and a database application. The database application may send a message to the DBMS that includes payload data describing a database query or other operations to be run at the database. The DBMS may execute the requested operation or operations at the database and send a return message to the database application. The return message may include payload data that describes results of the requested operation or operations.

In another example, messaging clients may include a control application for an industrial process and a monitoring application for monitoring the industrial process or a sub-unit thereof. For example, the monitoring application may execute at a computing device in communication with one or more cameras, sensors, or other mechanisms for receiving information about the industrial process. The monitoring application may send a message to the control application including payload data that describes the output of the cameras, sensors, etc. that are in communication with the monitoring application.

In another example, messaging clients may include an Internet of Things (IOT) device, such as a home appliance, and a cloud service for monitoring and/or managing the IOT device. The IOT device may send messages to the cloud service where the payload data of the messages describes the IOT device including, for example, the output of sensors at the IOT device. For example, when the IOT device is a home appliance, the payload data may indicate a current status of the home appliance, a previous status of the home appliance, usage statistics for the home appliance, etc.

In yet another example, messaging clients may include a business application executed at a server and client applications for accessing the business application. The business application may perform various business-related processing such as, for example, customer relationship management, security risk management, supply chain management, product lifecycle management, enterprise resource planning, etc. The client application may direct messages to the business application that, for example, include payload data describing business transactions, such as purchases of goods or services. In some examples, the business application may direct messages to the client application including payload data describing results of business application processing.

In the examples above, and in other various messaging environments, a sending client creates a message including payload data. For example, the sending client may incorporate payload data into a message according to an application layer protocol such as application layer protocols on top of Transport Control Protocol (TCP) or User Datagram Protocol (UDP) transport layer protocols. Example protocols for incorporating payload data into a message include Hypertext Transport Protocol (HTTP), MQ Telemetry Transport (MQTT) Advanced Message Queueing Protocol (AMQP), etc. The message may include the payload data as well as various headers, footers, annotations, etc. that describe the structure of the message, the destination of the message, delivery information for the message, etc.

The payload data within a message may be organized in any suitable manner. For example, payload data may include distinct payload records describing different items and/or different features of the same item. A payload record may include one or more record fields and each record field may include different data. To illustrate, consider the IOT device example above. An example payload record provided by the IOT device to the cloud service may include a first record field describing the IOT device, a second record field describing a signal received from a sensor at the IOT device, and a third record field describing a time when the signal was received from the sensor. Also, consider the business application example from above. Example payload data sent from the client application to the business application may include a payload record describing a purchase transaction for goods or services. The payload record may include a first record field describing a customer of the transaction, a second record field a product or service purchased in the transaction, a third record field describing a quantity of the product or service purchased, etc.

Payload metadata may describe the structure of payload data in a message. For example, payload metadata may describe a number and type of payload records included in the payload data. Payload metadata may also describe payload records including, for example, a number of record fields included in a payload record, descriptions of data at different record fields, data types for different record fields (e.g., string, integer, float, etc.), etc.

FIG. 1 is a diagram showing one example of an environment 100 for describing message payload data. The environment includes messaging clients 102, 104, 106. A sending client 104 may direct a message 108 to the receiving client 106. A message broker 102 may execute a metadata service 112 that provides a metadata document 110 to the receiving client 106.

The messaging clients 102, 104, 106 may be or include any suitable computing hardware or software. For example, messaging clients 102, 104, 106 may be or include a server or other suitable computing device or devices (e.g., messaging client devices). Also, in some examples, messaging clients 102, 104, 106 may be or include an application executing at a suitable computing device. In some examples, two or more of the messaging clients 102, 104, 106 may comprise applications executing at a common computing device.

The sending client 104 may generate the message 108. As shown, the message 108 includes a header field, labeled MESSAGE HEADER in FIG. 1. The header field includes metadata identifier data. In the example of FIG. 1, the metadata identifier data is a string: "ABC123." The message 108 also includes payload data in a body portion labeled MESSAGE BODY in FIG. 1. In the example of FIG. 1, the payload data is "4711, P-100, 4." The message 108 may be directed to the receiving client 106.

When the message 108 is received by the receiving client 106, the receiving client 106 may utilize the metadata identifier data to retrieve the metadata document 110 for the message 108 from the message broker 102. For example, the metadata identifier data "ABC123" may be or include a universal resource locator (URL) address and/or domain name for the metadata service 112. The receiving client 106 may query the metadata service 112 (at the URL indicated by ABC123) via the message broker 102. In response the metadata service 112 may send the metadata document 110 to the receiving client 106. In some examples, such as when the metadata identifier data is not a URL, the receiving client 106 may provide the metadata identifier data as an input variable to metadata service 112.

Upon receiving the query of the receiving client 106, the metadata service 112 may identify the metadata document 110 corresponding to the query and return it to the receiving client 106. As illustrated, the metadata document 110 includes payload metadata describing the payload data at the body of the message 108. In the example of FIG. 1, the metadata document includes metadata identifying a payload record corresponding to a transaction. For example, the metadata record described by the metadata document 110 may include a record field indicating a customer for an order, having a numeric data type, a record field indicating an item purchased, having a string data type, and a record field indicating a quantity of the item purchased. In the example message 108, then, the payload data includes a record indicating that customer 4711 purchased 4 examples of product P-100.

In some examples, the receiving client 106 may maintain a metadata cache (see metadata cache 312 of FIG. 3) and may write the payload metadata included in the metadata document 110 to the metadata cache. When the receiving client 106 receives another message having the same metadata identifier data as the message 108, the receiving client 106 may retrieve the payload metadata from the metadata cache instead of sending an additional query to the metadata service 112. Also, although FIG. 1 specifically identifies a sending client 104 and a receiving client 106, in some examples the messaging client 106 may send a message to the messaging client 104, in which case the sending and receiving roles may be reversed.

In some examples, the systems and methods disclosed herein for describing message payload data may be facilitated by a message oriented middleware (MOM). A MOM may include hardware and/or software components for facilitating messaging between distributed messaging clients. For example, a MOM may provide one or more application programming interfaces (APIs) that allow messaging clients to exchange messages without making direct connections to one another. In this way, it may not be necessary for individual messaging clients to know particulars of the operating systems, network interfaces, etc. of other messaging clients with which they communicate.

Figure 2:
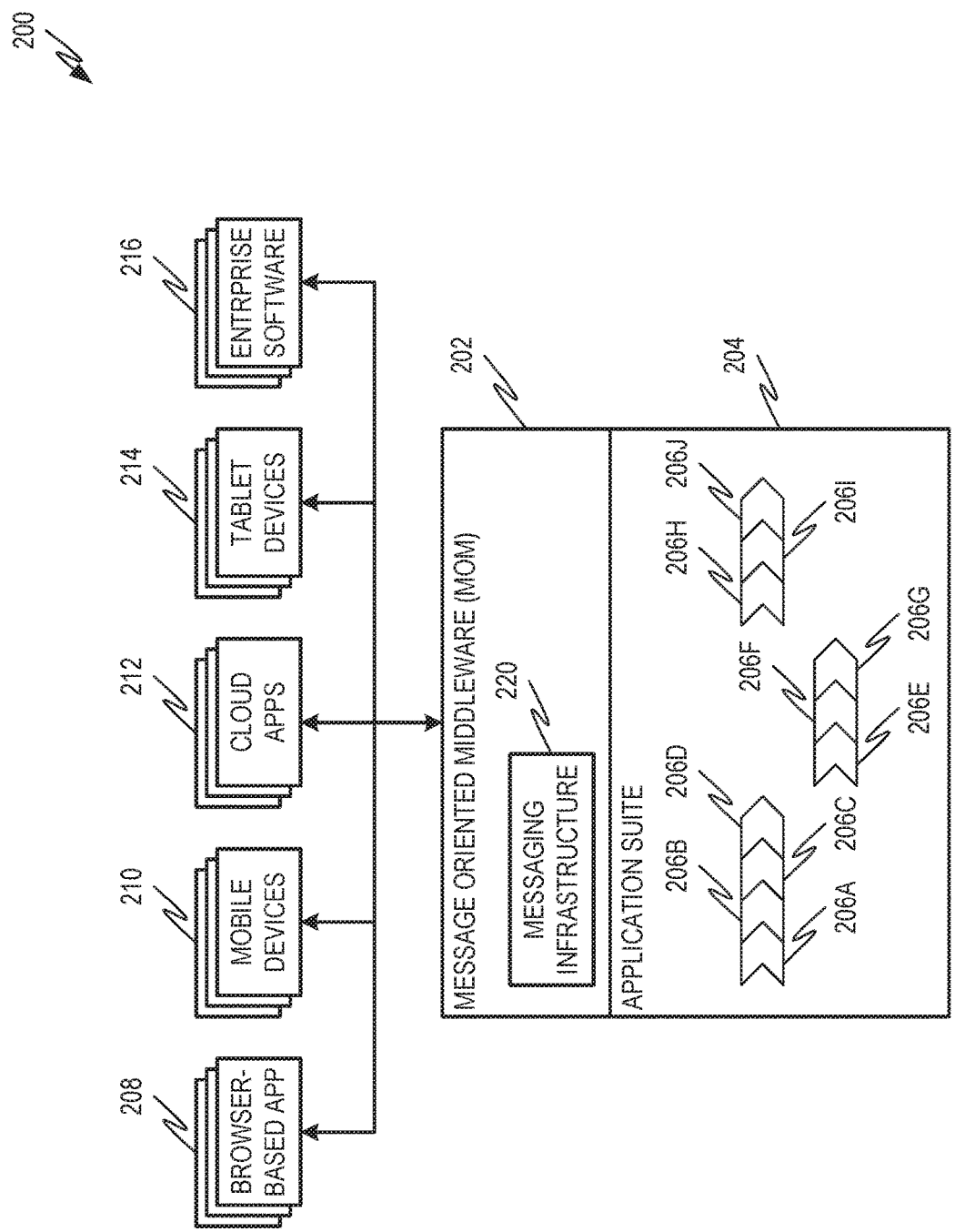
FIG. 2 is a diagram showing one example of an environment including a message oriented middleware providing connectivity between an application suite and various other applications and devices.

FIG. 2 is a diagram showing one example of an environment 200 including a message oriented middleware (MOM) 202 providing connectivity between an application suite 204 and various other applications 208, 212, 216 and devices 210, 214. In the example of FIG. 2, the MOM 202 includes a messaging infrastructure 220 that may be programmed, as described herein, to enable message payload data description as disclosed herein. For example, the messaging infrastructure 220 may be and/or include a message broker or other payload metadata source. In some examples, the MOM 202 may be or include the Netweaver Gateway system available from SAP SE of Walldorf, Germany. In the example of FIG. 2, the MOM 202 is configured to facilitate messaging between the application suite 204 and the various other applications 208, 212, 216 and devices 210, 214. In various examples, however, the MOM 202 may be configured to facilitate messaging between any suitable set of messaging clients.

The application suite 204 may comprise various applications 206A-I. In some examples, applications 206A-I may be configured to perform various business functions such as, for example, customer relationship management, security risk management, supply chain management, product lifecycle management, enterprise resource planning, etc. The application suite 204 may execute on any suitable computing device or devices in any suitable environment. In some examples, the MOM may act as a PI or programming interface enabling the applications 208, 212, 216 and devices 210, 214 to access the functionality of the application suite 204. In some examples, the application suite 204 may be or include the SAP Business Suite available from SAP SE of Walldorf, Germany, and, for example, may be executed at an instance of the Hana database management system, also available from SAP SE of Walldorf, Germany.

Applications 208, 212, 216 and devices 210, 214 provide examples of messaging clients that may exchange messages with applications 206A-I of the application suite 204. (For example, the applications 206A-I may also be messaging clients.) Browser-based applications 208 may include applications that are configured to execute on a web browser or other similar software tool. A web browser may be configured to execute on any suitable computing device. Mobile devices 210 may include any suitable computing devices configurable to communicate on a wireless network, such as for example, mobile telephones, etc. Mobile devices 210 may themselves be messaging clients, in some examples, may execute one or more mobile applications that operate as messaging clients. Similarly, tablet devices 214 may include any suitable computing device configurable to communicate on a wireless network. In some examples, tablet devices 214 may be larger than mobile devices 210. Like mobile devices 210, tablet devices 214 may themselves be messaging clients and/or may execute applications that are messaging clients.

Cloud applications 212 may include applications executed at a remote server or other computing device, for example, according to a Software-as-a-Service (SAAS) model. For example, users of cloud applications 212 may access cloud applications 212 by logging-in to a remote server or other similar computing device. Enterprise software 216 may include software applications utilized by multiple users and multiple computing devices, for example, of a common business enterprise. Examples of enterprise software 216 may include office suite programs, such as Microsoft Office®, database programs such as Microsoft Access®, document management systems, such as Microsoft Sharepoint®, etc.

Figure 3:
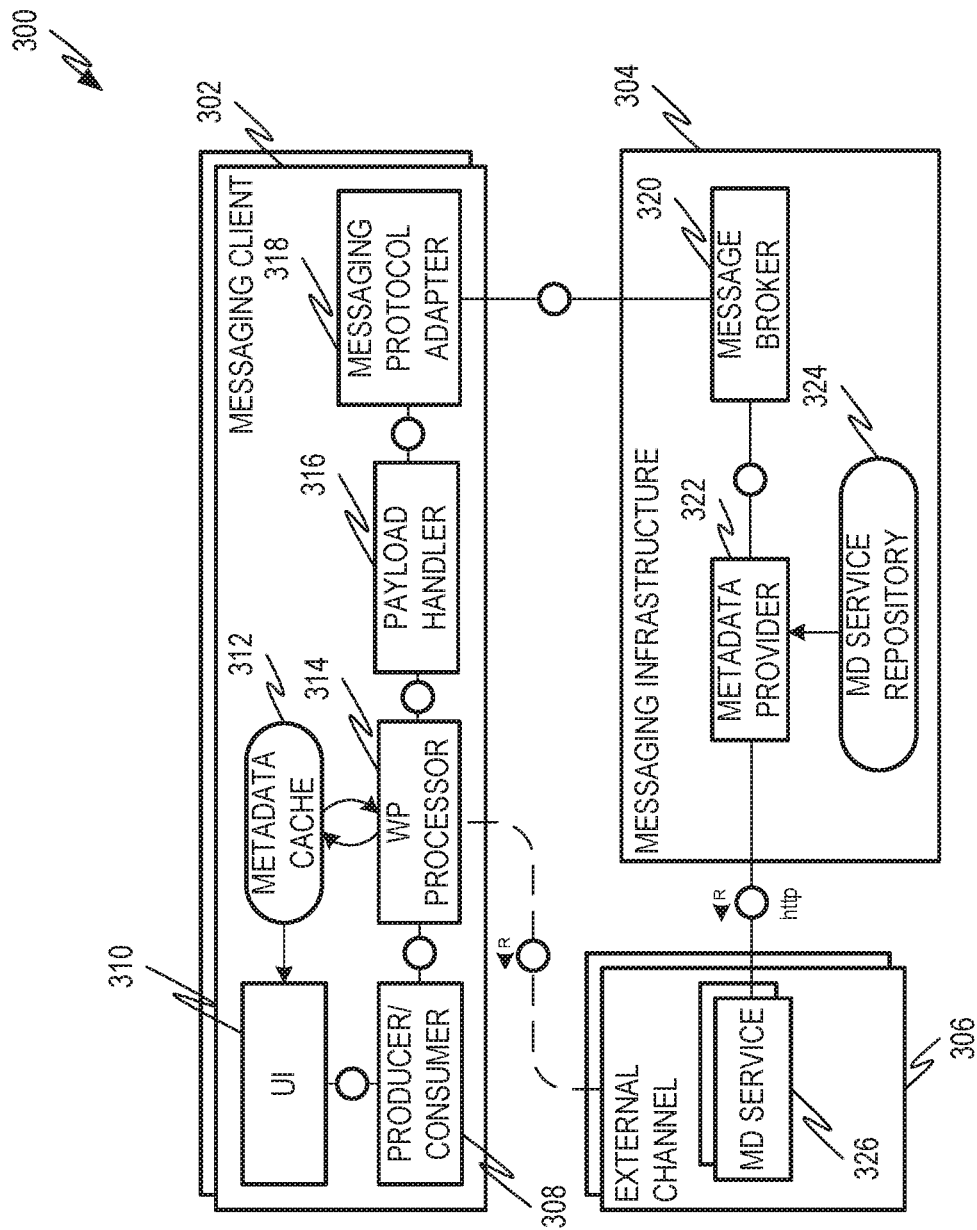
FIG. 3 is a diagram showing one example of an environment including a messaging client and a messaging infrastructure configured to implement describing payload data.

FIG. 3 is a diagram showing one example of an environment 300 including a messaging client 302 and a messaging infrastructure 304. The messaging infrastructure 304 may facilitate messaging between messaging clients, such as the messaging client 302. In some examples, the messaging infrastructure may be implemented as a component of a MOM, such as the messaging infrastructure 220 of the MOM 202 of FIG. 2. In other examples, the message infrastructure 220 may be implemented as a stand-alone service for messaging clients, such as 302. In the example environment 300, various components are configured to operate on payload data organized according to an OData wire protocol. In various examples, however, other suitable wire protocols may be used.

The example messaging client 302 is one example configuration of a messaging client showing components that some messaging clients may have. For example, the messaging client 302 comprises a messaging protocol adapter 318, a payload handler 316, a wire protocol processor 314, a metadata cache 312, a producer/consumer module 308, and a user interface (UI) 310. The messaging client 302 may be a sending client that sends messages to other messaging clients, a receiving client that receives messages from other messaging clients and/or a bi-directional client that acts both as a sending client and as a receiving client.

In the example of FIG. 3, the messaging client 302 comprises the UI 310 for interfacing with one or more users. In some examples, the UI 310 may be implemented utilizing a user interface development toolkit such as the User Interface Development Toolkit for HTML5 (or SAPUI5) available from SAP SE of Walldorf, Germany. In general, the UI 310 may enable a user to view and/or or receive data. The nature of the UI 310 may depend on the nature of the application or device that is or that implements the messaging client 302. For example, when messaging client 302 is implemented by a document management system, the UI 310 may enable a user to save documents to the document management system, retrieve data about documents saved at the document management system, retrieve documents stored at the document management system etc. In another example, when the messaging client 302 is implemented by an IOT device, the UI 310 may enable the user to enter and/or receive data describing the IOT device. In yet another example, when the messaging client 302 is implemented by a database application, the UI 310 may enable a user to enter database requests and/or review reviews of database requests.

The messaging client 302 also includes an optional producer/consumer module 308. The producer/consumer module 308 may be configured to format payload data directed either to or from the UI 310. For example, when a user utilizes the UI 310 in a way that calls for a message to be sent to another messaging client, payload data may be provided to the producer/consumer module 308. The producer/consumer module 308 may format the payload data according to the wire protocol. For example, payload records and record fields may be expressed according to the syntax of the wire protocol. In the example of FIG. 3, the wire protocol is a version of the OData protocol, but any suitable wire protocol may be used. In some examples, the producer/consumer module 308 may generate payload metadata, as described herein. When a message is received by the messaging client 302, the producer/consumer module 308 may receive payload data (and optionally payload metadata) and may process the payload data to put in in a format that is directly consumable by the UI 310. In some examples, the producer/consumer module 308 may be omitted. For example, the UI 310 may communicate with the metadata cache 312 to receive payload metadata and may generate and/or parse payload data.

A wire protocol processor 314 may be positioned to communicate with the producer/consumer module 308 and/or the metadata cache to parse message payloads in a wire protocol, such as OData. For example, for messages directed to the messaging client 318, the wire protocol processor 314 may utilize payload metadata to extract payload records and record fields from the payload data. The Wire protocol processor 314 may receive payload metadata, for example, from metadata cache and/or indirectly from the messaging infrastructure. For messages sent from the messaging client, the wire protocol processor 314 may put payload data into the Wire protocol format, for example, according to the payload metadata. In some examples, (e.g. examples where the wire protocol is OData) the wire protocol processor 314 may be or include the Apache Olingo library available from the Apache Software Foundation.

A payload handler 316 may parse messages and payload data for inbound and outbound messages. For example, the payload handler 316 may extract payload data from inbound messages and incorporate payload data into message form for outbound messages. A messaging protocol adapter 318 may be configured to provide and/or obtain payload metadata according to the wire protocol. For example, the messaging protocol adapter 318 may be configured to send messages to the message broker 320 either including payload metadata created by the messaging client 302 and/or requesting payload metadata corresponding to a metadata identifier data of a message received by the messaging client.

Referring now to the messaging infrastructure 304, the message broker 320 may be configured to exchange messages with various messaging clients, such as the messaging client 302. For example, message broker 320 may be or include a messaging client. The message broker 320 may receive messages from other messaging clients requesting payload metadata and including a metadata identifier data. The message broker 320 may send to the requesting messaging client a return message including a metadata document or other indication of the requested payload metadata.

A metadata provider 322 may be configured to retrieve payload metadata. In some examples, the metadata provider 322 may be in communication with an external channel 306 including a metadata service 326. In examples where the wire protocol is an OData protocol, the metadata service 326 may be an OData service. The metadata provider 322 may be configured to query the metadata service 326 to receive metadata documents describing payload metadata requested by a messaging client (e.g., through the message broker 320). In some examples, the messaging infrastructure 304 may also include a metadata service repository 324. The metadata service repository 324 may include metadata documents or other examples of payload metadata received from the metadata service 326 or other source. For example, when the metadata provider 322 receives a request for payload metadata, it may first refer to the metadata service repository 324 before querying the metadata service 326. If the requested payload metadata is at the metadata service repository 324, it may obviate the need to query the metadata service 326.

Figure 4:
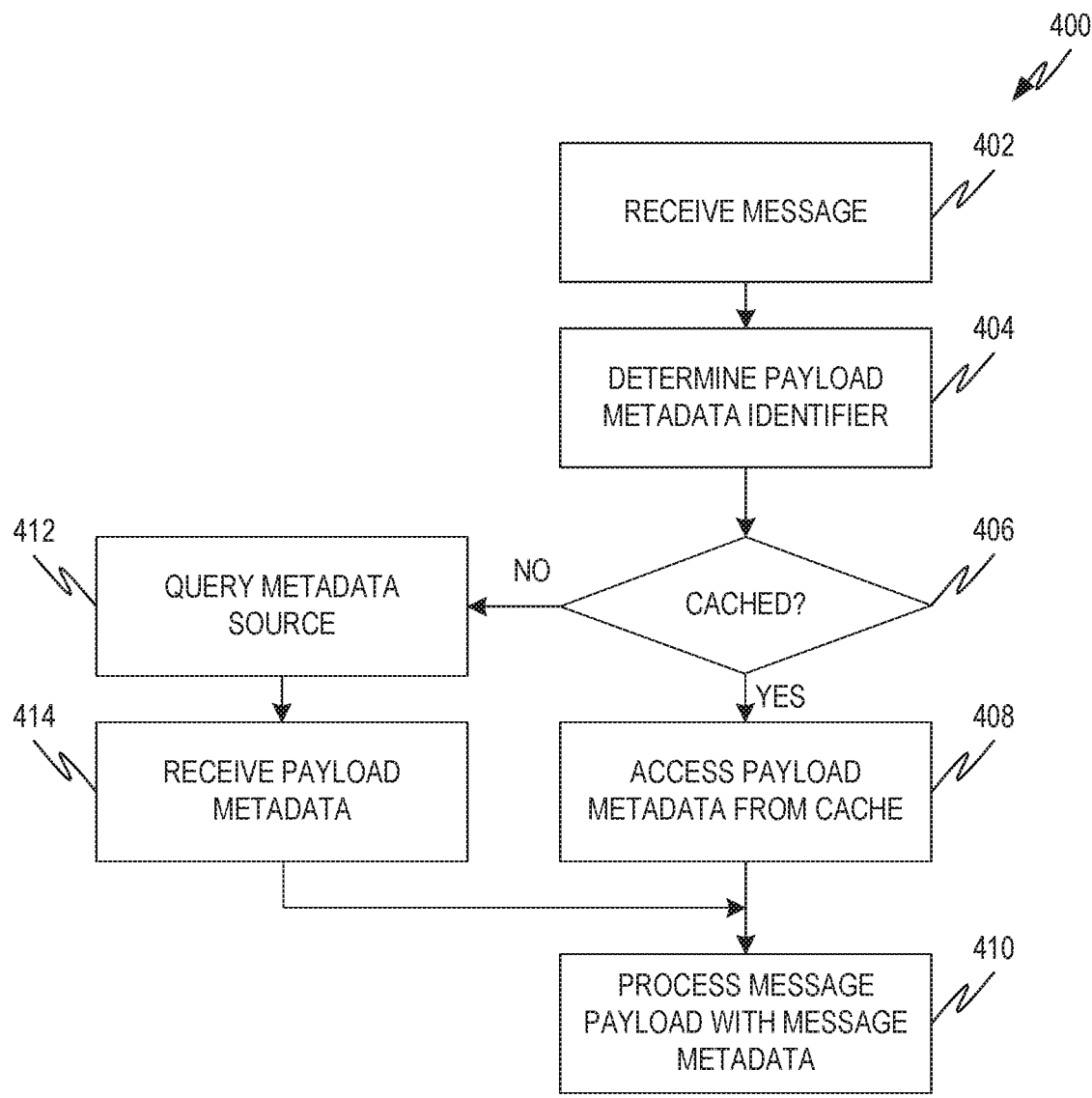
FIG. 4 is a flowchart showing one example of a process flow that may be executed by a receiving client to process a received message with payload data described as disclosed herein.

FIG. 4 is a flowchart showing one example of a process flow 400 that may be executed by a receiving client to process a received message with payload data described as disclosed herein. Some aspects of the process flow 400 are described with reference the messaging client 302 of FIG. 3 acting as the receiving client, however, in various examples, any suitable receiving client may be used such as, for example, the receiving client 106 of FIG. 1 and/or any of the messaging clients described with reference to FIG. 2.

At operation 402, the receiving client may receive a message. The message may be organized according to any suitable format or protocol. For example, a transport layer protocol, such as TCP/IP, may describe the way that the message is assembled from packets received by the receiving client. An application layer protocol, such as HTTP, may describe headers, etc., incorporated into the message as well as other message formatting details. The wire protocol, such as OData, may describe the structure of the payload, for example, in accordance with payload metadata. In some examples, the receiving client may include a messaging protocol adapter for handling the transport layer and/or application layer protocol, such as messaging protocol adapter 318 of the messaging client 302 in FIG. 3.

At operation 404, the receiving client may determine a metadata identifier data, for example, from the received message. The metadata identifier data may be embedded into the received message in any suitable manner. In some examples, the message may include an additional header that includes the metadata identifier data, for example, at the application protocol level. In other examples, the metadata identifier data may be embedded in the payload data itself. The metadata identifier data may take any suitable form.

The code below illustrates an example where the metadata identifier data is a service name (e.g., a metadata service such as an OData service) and is included at an additional header of the payload data of the message. In the example below, the payload data portion of the received message is represented between the outer brackets "{ }". For example, the header portion indicated in the example below may be a header portion of the payload data and may be distinct from headers, footers, annotations, etc., added to the message according to the application layer protocol and/or transport layer protocol. The header portion of the payload data indicates a service name (e.g., "xyz") according to the wire protocol. For example, when the wire protocol is a version of OData, the service name may refer to an OData service. The portion of the payload indicated below as "Payload Record(s)" may include one or more payload records, for example, as described herein.

```
{
    header [
        {name: value,
            Service: xyz}
    ]
    body {Payload Record(s) }
}
```

At operation 406, the receiving client may determine whether a metadata cache at the receiving client includes payload metadata corresponding to the metadata identifier data. Referring to the code example above, if the receiving client has previously received a message including the metadata identifier data "xyz," then a metadata cache at the receiving client may include a metadata document or other form of the payload metadata. If yes, the receiving client may access payload metadata from the metadata cache at operation 408.

If the metadata cache does not include the payload metadata referenced by the metadata identifier data, then the receiving client may, at operation 412, query a metadata provider indicated by the metadata identifier data. For example, the metadata identifier data may include a Universal Resource Locator (URL) or other address and/or name indicating a location where payload metadata may be retrieved. Referring to the example of FIG. 3, the messaging client 302 (acting as receiving client) may query the message broker 320. In some examples, the messaging client may directly query the metadata service 326, as shown. At operation 414, the receiving client may receive the requested payload metadata from the metadata source.

The receiving client may proceed to operation 410 either from operation 414 or from operation 408. At operation 410, the receiving client may process the payload data with the payload metadata. Any suitable processing may be performed. For example, processing the payload data may comprise using the payload metadata to identify at least one payload record and/or record field and performing an operation on the identified payload record or record field. The operation may include, for example, storing the data at the payload record or record field at a database or other storage location, modifying or updating the payload record or record field, utilizing the payload record or record field as an argument for a function call, query, etc., incorporating the payload record or record field into a new message to another messaging client, etc.

For example, consider the DBMS and database application example introduced above. The database application may send to the DBMS a message including payload data describing a database query. The DBMS (e.g., the receiving client) may process the payload data included in the message by utilizing the payload metadata to identify a payload record in the message corresponding to the database query. The DBMS may perform further processing, for example, by utilizing the payload metadata to identify a record field within the identified record that includes an argument for the database query (e.g., a specific table, view, function, etc. to be executed at and/or returned by the DBMS). Upon identifying the payload data records corresponding to the database query and/or arguments therefor, the DBMS may execute the query. In the DBMS and database application example, the DBMS may send a return message to the database application including results of the database query requested by the database application. The database application (e.g., in this case the receiving client) may utilize payload metadata to identify a payload record in the return message including a field of a table, view, function, etc. that was requested.

Referring to the industrial process control and monitoring example introduced above, the monitoring application may send a message to the control application. The message may include data describing sensor readings recorded by the monitoring application from different sensors and/or at different times. The control application may process the payload data by utilizing payload metadata to identify a payload data record corresponding to a reading from a particular sensor, for example, at a particular time. In some examples, the control application may utilize the payload metadata to identity record fields in one or more payload records that indicate the sensor that captured data in a particular reading and/or a time at which the reading was taken. The control application may perform an additional operation on the sensor readings identified at payload records or record fields, for example, by storing sensor readings at a record database, using sensor readings to determine one or more control instructions to the industrial process, etc.

Referring to the IOT example introduced above where the IOT device is a home appliance, the home appliance may send a message to the cloud service indicating a state of the home appliance (e.g., turned on). The cloud service may utilize payload metadata to identify a payload record or record field describing the state of the home appliance. The cloud service may perform a further operation on the identified payload record or record field, for example, by storing the state of the home appliance at a record database and/or by determining an instruction to the home appliance to be included in a subsequent message (e.g., turn-off in 10 minutes).

Referring to the business application and client application example introduced above, the client application may send a message including data describing a purchase of goods, for example, as illustrated in the example of FIG. 1. The business application may utilize payload metadata to identify a payload record including the description of the transaction or a record field including data describing the transaction (e.g., customer, product, quantity, price, etc.). The business application may perform an additional operation, for example, by updating a supply chain management database to indicate that the products described by the payload record have been sold.

Figure 5:
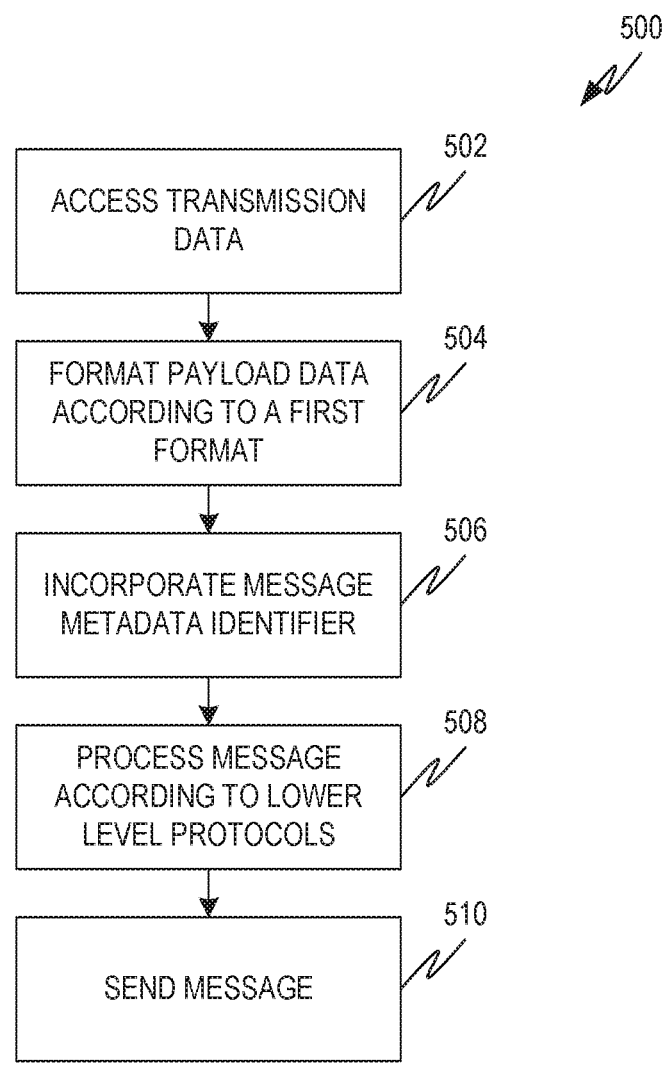
FIG. 5 is a flowchart showing one example of a process flow that may be executed by a receiving client to generate and send a message with payload data described as disclosed herein.

FIG. 5 is a flowchart showing one example of a process flow 500 that may be executed by a sending client to generate and send a message with payload data described as disclosed herein. Some aspects of the process flow 500 are described with reference the messaging client 302 of FIG. 3 acting as the sending client, however, in various examples, any suitable sending client may be used such as, for example, the sending client 104 of FIG. 1 and/or any of the messaging clients described with reference to FIG. 2.

At operation 502, the sending client may access transmission data. Transmission data may be data that is to be transmitted in a message, for example, as payload data. Transmission data may be formatted in any suitable manner. For example, transmission data may be received via user interface fields from a UI, such as the UI 310 described above and may be delimited, for example, by the UI field or fields in which it was received. In some examples, transmission data may include database tables, views, records, etc. organized according to a schema of the database. The transmission data may be accessed from a memory or other data storage of or otherwise accessible to the sending client.

At operation 504, the sending client may format the transmission data to generate payload data according to a first data format (e.g., OData or another wire protocol). This may include, for example, parsing the transmission data into payload records and record fields as indicated by payload metadata for the message. The receiving client may create the payload metadata and/or may receive the payload metadata from another source and format the payload data according to the payload metadata. For example, the sending client may query a message broker and/or metadata service to retrieve the payload metadata. Referring to FIG. 3, operation 504 may be performed, for example, by the wire protocol processor 314.

At operation 506, the sending client may incorporate a payload metadata identifier data into the payload data and/or otherwise into the message to be sent. The payload metadata identifier data may be incorporated, for example, as described above with respect to the process flow 400. For example, the sending client may generate a header portion of the second payload data. For example, the sending client may initialize additional logical data blocks in the payload data for including the metadata identifier data. At operation 508, the sending client may process the message according to lower level protocols (e.g., application layer protocols, transport layer protocols, physical layer protocols, etc.). For example, the sending client may take the payload data and incorporate headers, footers, and/or other structure to conform to the selected application, transport, and/or other transmission protocols. At operation 510, the sending client may send the message to a receiving client.

Figure 6:
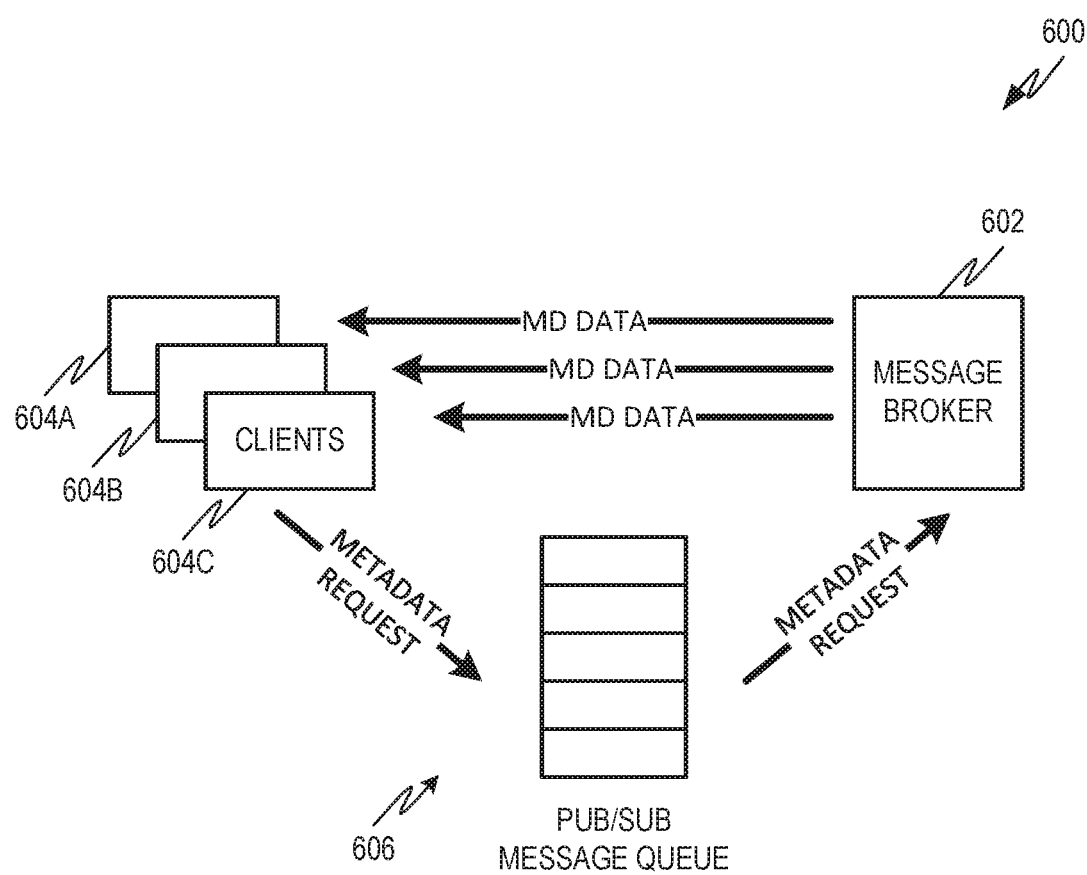
FIG. 6 is a diagram showing one example of a workflow for providing payload metadata to receiving clients.

FIG. 6 is a diagram showing one example of a workflow 600 for providing payload metadata to receiving clients 604A, 604B, 604C. In the workflow 600, the receiving clients 604A, 604B, 604C and a message broker 602 may utilize a publication/subscription or "pub/sub" mechanism to distribute payload metadata. For example, a client 604C may send a metadata request to a pub/sub queue 606. Different types of metadata requests may be made, for example, based on the source. For example, if the client 604A, 604B, 604C is a producer, it may receive payload metadata prior to preparing payload data. If the client 604A, 604B, 604C is a consumer of messages, it may make the metadata request in a lazy manner. For example, a consumer client may not make the metadata request to the pub/sub queue until after it has received a message.

A metadata request to the pub/sub message queue 606 may include various data. In some examples, the metadata request may include a field indicating the type of request being made. For example, a request from a producer may be more urgent than a request from a consumer. Also, the metadata request may include a header including payload metadata identifier data, which may refer to a metadata service for providing the metadata. In some examples, the metadata identifier may include a URL or other identification of the metadata service, such as an OData service. In some examples, a metadata request may also include data indicating the form of a reply expected by the receiving client 604A, 604B, 604C. In some examples, the metadata request may also include data indicating an address of the pub/sub queue 606. The metadata request may also include data indicating a URL or other reply address describing the receiving client 604C to which the message broker 602 should direct a reply message.

The message broker 602 may subscribe to the pub/sub queue 606. When the receiving client 604C writes a metadata request to the pub/sub queue 606, the message broker 602 may retrieve the message. From the message the message broker 602 may determine the payload metadata requested by the receiving client 604C (e.g., from the payload metadata identifier data) and the identity of the requesting receiving client 604C (e.g., from the address of the receiving client 604C). In response, the message broker 602 may direct a return message to the receiving client 604C. For example, the message broker 602 may send the return message via a point-to-point connection with the receiving client. The return message may include, for example, the requested payload data. The workflow 600 shows just one example way that the clients 604A, 604B, 604C may receive payload metadata. In other examples, payload data may be stored at a location directly accessible by one or more of the clients 604A, 604B, 604C such as, for example, a location referenced by a URL.

Figure 7:
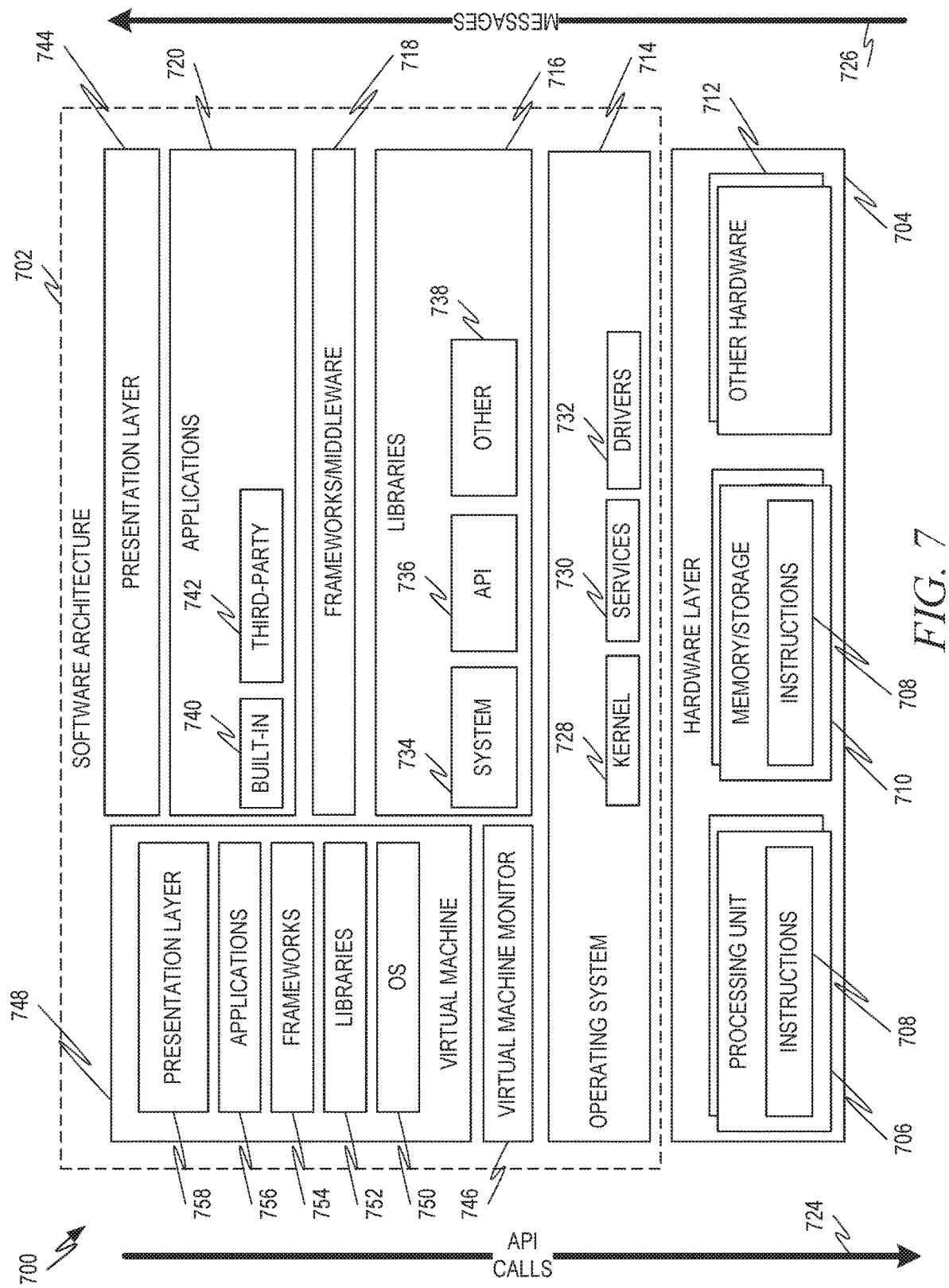
FIG. 7 is a block diagram showing one example of a software architecture for a computing device.

FIG. 7 is a block diagram 700 showing one example of a software architecture 702 for a computing device. The architecture 702 maybe used in conjunction with various hardware architectures, for example, as described herein. FIG. 7 is merely a non-limiting example of a software architecture and many other architectures may be implemented to facilitate the functionality described herein. A representative hardware layer 704 is illustrated and can represent, for example, any of the above referenced computing devices. In some examples, the hardware layer 704 may be implemented according to the architecture of the computer system 800 of FIG. 8.

The representative hardware layer 704 comprises one or more processing units 706 having associated executable instructions 708. Executable instructions 708 represent the executable instructions of the software architecture 702, including implementation of the methods, modules, subsystems, and components, and so forth described herein and may also include memory and/or storage modules 710, which also have executable instructions 708. Hardware layer 704 may also comprise other hardware as indicated by other hardware 712 which represents any other hardware of the hardware layer 704, such as the other hardware illustrated as part of computer system 800.

In the example architecture of FIG. 7, the software architecture 702 may be conceptualized as a stack of layers where each layer provides particular functionality. For example, the software architecture 702 may include layers such as an operating system 714, libraries 716, frameworks/middleware 718, applications 720 and presentation layer 744. Operationally, the applications 720 and/or other components within the layers may invoke application programming interface (API) calls 724 through the software stack and access a response, returned values, and so forth illustrated as messages 726 in response to the API calls 724. The layers illustrated are representative in nature and not all software architectures have all layers. For example, some mobile or special purpose operating systems may not provide a frameworks/middleware layer 718, while others may provide such a layer. Other software architectures may include additional or different layers.

The operating system 714 may manage hardware resources and provide common services. The operating system 714 may include, for example, a kernel 728, services 730, and drivers 732. The kernel 728 may act as an abstraction layer between the hardware and the other software layers. For example, the kernel 728 may be responsible for memory management, processor management (e.g., scheduling), component management, networking, security settings, and so on. The services 730 may provide other common services for the other software layers. In some examples, the services 730 include an interrupt service. The interrupt service may detect the receipt of an interrupt and, in response, cause the architecture 702 to pause its current processing and execute an interrupt service routine (ISR) when an interrupt is accessed.

The drivers 732 may be responsible for controlling or interfacing with the underlying hardware. For instance, the drivers 732 may include display drivers, camera drivers, Bluetooth® drivers, flash memory drivers, serial communication drivers (e.g., Universal Serial Bus (USB) drivers), Wi-Fi® drivers, NFC drivers, audio drivers, power management drivers, and so forth depending on the hardware configuration.

The libraries 716 may provide a common infrastructure that may be utilized by the applications 720 and/or other components and/or layers. The libraries 716 typically provide functionality that allows other software modules to perform tasks in an easier fashion than to interface directly with the underlying operating system 714 functionality (e.g., kernel 728, services 730 and/or drivers 732). The libraries 716 may include system 734 libraries (e.g., C standard library) that may provide functions such as memory allocation functions, string manipulation functions, mathematic functions, and the like. In addition, the libraries 716 may include API libraries 736 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 9D in a graphic content on a display), database libraries (e.g., SQLite that may provide various relational database functions), web libraries (e.g., WebKit that may provide web browsing functionality), and the like. The libraries 716 may also include a wide variety of other libraries 738 to provide many other APIs to the applications 720 and other software components/modules. In some examples, libraries 738 may provide one or more APIs serviced by a message oriented middleware.

The frameworks 718 (also sometimes referred to as middleware) may provide a higher-level common infrastructure that may be utilized by the applications 720 and/or other software components/modules. For example, the frameworks 718 may provide various graphic user interface (GUI) functions, high-level resource management, high-level location services, and so forth. The frameworks 718 may provide a broad spectrum of other APIs that may be utilized by the applications 720 and/or other software components/modules, some of which may be specific to a particular operating system or platform.

The applications 720 includes built-in applications 740 and/or third party applications 742. Examples of representative built-in applications 740 may include, but are not limited to, a contacts application, a browser application, a book reader application, a location application, a media application, a messaging application, and/or a game application. Third party applications 742 may include any of the built in applications as well as a broad assortment of other applications. In a specific example, the third party application 742 (e.g., an application developed using the Android™ or iOS™ software development kit (SDK) by an entity other than the vendor of the particular platform) may be mobile software running on a mobile operating system such as iOS™, Android™, Windows® Phone, or other mobile computing device operating systems. In this example, the third party application 742 may invoke the API calls 724 provided by the mobile operating system such as operating system 714 to facilitate functionality described herein.

The applications 720 may utilize built in operating system functions (e.g., kernel 728, services 730 and/or drivers 732), libraries (e.g., system 734, APIs 736, and other libraries 738), frameworks/middleware 718 to create user interfaces to interact with users of the system. Alternatively, or additionally, in some systems interactions with a user may occur through a presentation layer, such as presentation layer 744. In these systems, the application/module "logic" can be separated from the aspects of the application/module that interact with a user.

Some software architectures utilize virtual machines. In the example of FIG. 7, this is illustrated by virtual machine 748. A virtual machine creates a software environment where applications/modules can execute as if they were executing on a hardware computing device. A virtual machine is hosted by a host operating system (operating system 714) and typically, although not always, has a virtual machine monitor 746, which manages the operation of the virtual machine as well as the interface with the host operating system (i.e., operating system 714). A software architecture executes within the virtual machine such as an operating system 750, libraries 752, frameworks/middleware 754, applications 756 and/or presentation layer 758. These layers of software architecture executing within the virtual machine 748 can be the same as corresponding layers previously described or may be different.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client, or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or another programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired), or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces e.g., APIs).

Electronic Apparatus and System

Example embodiments may be implemented in digital electronic circuitry, or in computer hardware, firmware, or software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., an FPGA or an ASIC.

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Example Machine Architecture and Machine-Readable Medium

Figure 8:
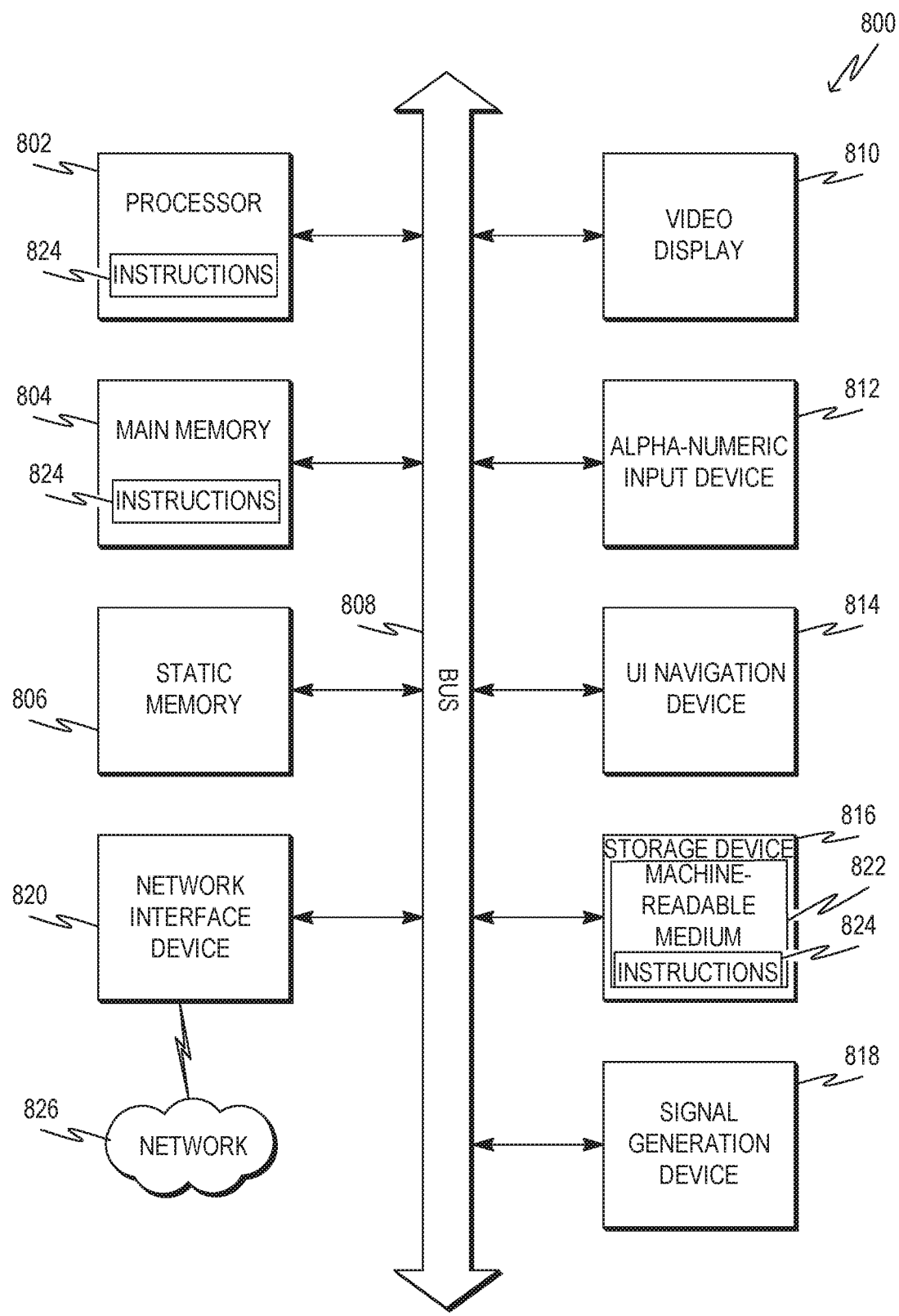
FIG. 8 is a block diagram of a machine in the example form of a computer system within which instructions may be executed for causing the machine to perform any one or more of the methodologies discussed herein.

FIG. 8 is a block diagram of a machine in the example form of a computer system 800 within which instructions 824 may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch, or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804, and a static memory 806, which communicate with each other via a bus 808. The computer system 800 may further include a video display unit 810 (e.g., a liquid crystal display (LCD) or a cathode ray tube (CRT)). The computer system 800 also includes an alphanumeric input device 812 (e.g., a keyboard or a touch-sensitive display screen), a user interface (UI) navigation (or cursor control) device 814 (e.g., a mouse), a disk drive unit 816, a signal generation device 818 (e.g., a speaker), and a network interface device 820.

Machine-Readable Medium

The disk drive unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media 822.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding, or carrying instructions 824 for execution by the machine and that cause the machine to perform any one or more of the methodologies of the present disclosure, or that is capable of storing, encoding, or carrying data structures utilized by or associated with such instructions 824. The term "machine-readable medium" shall accordingly be taken to include, but not be limited to, solid-state memories, and optical and magnetic media. Specific examples of machine-readable media 822 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., WiFi and WiMax networks). The term "transmission medium" shall be taken to include any intangible medium that is capable of storing, encoding, or carrying instructions 824 for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the disclosure. Accordingly, the specification and drawings are to be regarded in an illustrative rather than a restrictive sense. The accompanying drawings that form a part hereof show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

Examples

Example 1 is a computer messaging system, comprising: a messaging client device comprising at least one processor and a machine readable medium in communication with the at least one processor, wherein the messaging client device is programmed to perform operations comprising: receiving a first message comprising first payload data; identifying from the first message a first metadata identifier data; sending a first metadata request to a metadata source indicated by the first metadata identifier data; receiving from the metadata source, first payload metadata describing the first payload data; and identifying a first payload record from the first payload data, wherein the identifying is based at least in part on the first payload metadata.

In Example 2, the subject matter of Example 1 optionally includes writing the first payload metadata to a metadata cache.

In Example 3, the subject matter of any one or more of Examples 1-2 optionally include wherein the messaging client device is further programmed to perform operations comprising determining, before sending the first metadata request, that the first payload metadata indicated by the first metadata identifier data is not present at a metadata cache of the messaging client device.

In Example 4, the subject matter of any one or more of Examples 1-3 optionally include wherein the messaging client device is further programmed to perform operations comprising: receiving a second message comprising second payload data; identifying from the second message a second metadata identifier data; determining that second payload metadata indicated by the second metadata identifier data is stored at a metadata cache of the messaging client device; and based at least in party on the second payload metadata, identifying a second payload record from the second payload data.

In Example 5, the subject matter of any one or more of Examples 1-4 optionally include wherein sending the first metadata request comprises publishing the first metadata request to a publication/subscription service queue with reply address data describing the messaging client device.

In Example 6, the subject matter of any one or more of Examples 1-5 optionally include wherein the messaging client device is further programmed to perform operations comprising: accessing transmission data to be sent to a second messaging client; formatting the transmission data to second payload data according to second payload metadata, wherein the second payload metadata describes at least one payload record for the second payload data and at least one record field for the second payload data; adding second metadata identifier data to the second payload data, the second metadata identifier data describing the second payload metadata; and sending a second message to a second messaging client, the second message comprising the second payload data.

In Example 7, the subject matter of Example 6 optionally includes wherein adding the second metadata identifier data to the second payload data comprises generating a header portion of the second payload data and writing the second metadata identifier data to the header portion.

In Example 8, the subject matter of any one or more of Examples 1-7 optionally include a message broker computing device comprising a second at least one processor and a second machine readable medium in communication with the second at least one processor, wherein the message broker is the metadata source, and wherein the message broker computing device is programmed to perform operations comprising: receiving the first metadata request; determining that the first payload metadata is stored at a metadata service repository; retrieving the first payload metadata from the metadata service repository; and sending the first payload metadata to the messaging client device.

In Example 9, the subject matter of any one or more of Examples 1-8 optionally include a message broker computing device comprising a second at least one processor and a second machine readable medium in communication with the second at least one processor, wherein the message broker is the metadata source, and wherein the message broker computing device is programmed to perform operations comprising: receiving the first metadata request; determining that the first payload metadata is not stored at a metadata service repository; querying a metadata source to obtain the first payload metadata; and sending the first payload metadata to the messaging client device.

In Example 10, the subject matter of any one or more of Examples 1-9 optionally include a message broker computing device comprising a second at least one processor and a second machine readable medium in communication with the second at least one processor, wherein the message broker is the metadata source, and wherein the message broker computing device is programmed to perform operations comprising: receiving the first metadata request from a publication/subscription queue; determining an address of the messaging client device from the first metadata request; and sending the first payload metadata to the messaging client device at the address.

Example 11 is a computer-implemented messaging method, comprising: receiving a first message, by a messaging client executed at a first computing device comprising at least one processor and a memory in communication with the at least one processor, wherein the first message comprises first payload data; identifying, by the messaging client and from the first message a first metadata identifier data; sending a first metadata request by the messaging client and to a metadata source indicated by the first metadata identifier data; receiving, by the messaging client and from the metadata source, first payload metadata describing the first payload data; and identifying, by the messaging client, a first payload record from the first payload data, wherein the identifying is based at least in part on the first payload metadata.

In Example 12, the subject matter of Example 11 optionally includes writing the first payload metadata to a metadata cache.

In Example 13, the subject matter of any one or more of Examples 11-12 optionally include determining, by the messaging client and before sending the first metadata request, that the first payload metadata indicated by the first metadata identifier data is not present at a metadata cache of the messaging client.

In Example 14, the subject matter of any one or more of Examples 11-13 optionally include receiving, by the messaging client, a second message comprising second payload data; identifying, by the messaging client, from the second message a second metadata identifier data; and determining, by the messaging client, that second payload metadata indicated by the second metadata identifier data is stored at a metadata cache of the messaging client.

In Example 15, the subject matter of any one or more of Examples 11-14 optionally include wherein the metadata source comprises a metadata service, and wherein the first metadata identifier data comprises a universal resource locator (URL) for the metadata service.

In Example 16, the subject matter of any one or more of Examples 11-15 optionally include wherein identifying the first metadata identifier data comprises reading the metadata identifier data from a header portion of the first payload data.

In Example 17, the subject matter of any one or more of Examples 11-16 optionally include wherein sending the first metadata request comprises publishing the first metadata request to a publication/subscription service queue with reply address data describing the messaging client.

In Example 18, the subject matter of any one or more of Examples 11-17 optionally include accessing, by the messaging client, transmission data to be sent to a second messaging client; formatting, by the messaging client, the transmission data to second payload data according to second payload metadata, wherein the second payload metadata describes at least one payload record for the second payload data and at least one record field for the second payload data; adding, by the messaging client, second metadata identifier data to the second payload data, the second metadata identifier data describing the second payload metadata; and sending, by the messaging client, a second message to a second messaging client, the second message comprising the second payload data.

In Example 19, the subject matter of Example 18 optionally includes wherein adding the second metadata identifier data to the second payload data comprises generating a header portion of the second payload data and writing the second metadata identifier data to the header portion.

Example 20 is a machine readable medium comprising thereon instructions that, when executed by at least one processor, cause the at least one processor to perform operations comprising: receiving a first message comprising first payload data; identifying from the first message a first metadata identifier data; sending a first metadata request to a metadata source indicated by the first metadata identifier data; receiving from the metadata source, first payload metadata describing the first payload data; and identifying a first payload record from the first payload data, wherein the identifying is based at least in part on the first payload metadata.

What is claimed is:

1. A computer messaging system, comprising:
a messaging client device comprising at least one processor and a machine readable medium in communication with the at least one processor, wherein the messaging client device is programmed to perform operations comprising:
receiving a first message comprising first payload data and first metadata identifier data;
sending a first metadata request for first payload metadata not included in the first message, wherein the first metadata request is sent to a metadata source indicated by the first metadata identifier data, and wherein the metadata source is executed at a message broker computing device that is remote from the messaging client device;
receiving from the metadata source, the first payload metadata describing the first payload data; and
identifying a first payload record from the first payload data, wherein the identifying is based at least in part on the first payload metadata.

2. The computer messaging system of claim 1, further comprising writing the first payload metadata to a metadata cache.

3. The computer messaging system of claim 1, wherein the messaging client device is further programmed to perform operations comprising determining, before sending the first metadata request, that the first payload metadata indicated by the first metadata identifier data is not present at a metadata cache of the messaging client device.

4. The computer messaging system of claim 1, wherein the messaging client device is further programmed to perform operations comprising:
receiving a second message comprising second payload data;
identifying from the second message a second metadata identifier data;
determining that second payload metadata indicated by the second metadata identifier data is stored at a metadata cache of the messaging client device; and
based at least in party on the second payload metadata, identifying a second payload record from the second payload data.

5. The computer messaging system of claim 1, wherein sending the first metadata request comprises publishing the first metadata request to a publication/subscription service queue with reply address data describing the messaging client device.

6. The computer messaging system of claim 1, wherein the messaging client device is further programmed to perform operations comprising:
accessing transmission data to be sent to a second messaging client;
formatting the transmission data to second payload data according to second payload metadata, wherein the second payload metadata describes at least one payload record for the second payload data and at least one record field for the second payload data;
adding second metadata identifier data to the second payload data, the second metadata identifier data describing the second payload metadata; and
sending a second message to a second messaging client, the second message comprising the second payload data.

7. The computer messaging system of claim 6, wherein adding the second metadata identifier data to the second payload data comprises generating a header portion of the second payload data and writing the second metadata identifier data to the header portion.

8. The computer messaging system of claim 1, further comprising the message broker computing device, wherein the message broker computing device is programmed to perform operations comprising:
receiving the first metadata request;
determining that the first payload metadata is stored at a metadata service repository;
retrieving the first payload metadata from the metadata service repository; and
sending the first payload metadata to the messaging client device.

9. The computer messaging system of claim 1, further comprising the message broker computing device, wherein the message broker computing device is programmed to perform operations comprising:
receiving the first metadata request;
determining that the first payload metadata is not stored at a metadata service repository;
querying a metadata source to obtain the first payload metadata; and
sending the first payload metadata to the messaging client device.

10. The computer messaging system of claim 1, further comprising message broker computing device, wherein the message broker computing device is programmed to perform operations comprising:
receiving the first metadata request from a publication/subscription queue;
determining an address of the messaging client device from the first metadata request; and
sending the first payload metadata to the messaging client device at the address.

11. A computer-implemented messaging method, comprising:
receiving a first message, by a messaging client executed at a first computing device comprising at least one processor and a memory in communication with the at least one processor, wherein the first message comprises first payload data and first metadata identifier data;
sending, by the messaging client, a first metadata request for first payload metadata not included in the first message, wherein the first metadata request is sent to a metadata source indicated by the first metadata identifier data, and wherein the metadata source is executed at a message broker computing device that is remote from the first computing device;
receiving, by the messaging client and from the metadata source, the first payload metadata describing the first payload data; and
identifying, by the messaging client, a first payload record from the first payload data, wherein the identifying is based at least in part on the first payload metadata.

12. The method of claim 11, further comprising writing the first payload metadata to a metadata cache.

13. The method of claim 11, further comprising determining, by the messaging client and before sending the first metadata request, that the first payload metadata indicated by the first metadata identifier data is not present at a metadata cache of the messaging client.

14. The method of claim 11, further comprising:
receiving, by the messaging client, a second message comprising second payload data;
identifying, by the messaging client, from the second message a second metadata identifier data; and determining, by the messaging client, that second payload metadata indicated by the second metadata identifier data is stored at a metadata cache of the messaging client.

15. The method of claim 11, wherein the metadata source comprises a metadata service, and wherein the first metadata identifier data comprises a universal resource locator (URL) for the metadata service.

16. The method of claim 11, wherein identifying the first metadata identifier data comprises reading the first metadata identifier data from a header portion of the first payload data.

17. The method of claim 11, wherein sending the first metadata request comprises publishing the first metadata request to a publication/subscription service queue with reply address data describing the messaging client.

18. The method of claim 11, further comprising:
accessing, by the messaging client, transmission data to be sent to a second messaging client;
formatting, by the messaging client, the transmission data to second payload data according to second payload metadata, wherein the second payload metadata describes at least one payload record for the second payload data and at least one record field for the second payload data;
adding, by the messaging client, second metadata identifier data to the second payload data, the second metadata identifier data describing the second payload metadata; and
sending, by the messaging client, a second message to a second messaging client, the second message comprising the second payload data.

19. The method of claim 18, wherein adding the second metadata identifier data to the second payload data comprises generating a header portion of the second payload data and writing the second metadata identifier data to the header portion.

20. A non-transitory machine readable storage medium comprising thereon instructions that, when executed by at least one processor, cause the at least one processor to perform operations comprising:
receiving a first message comprising first payload data and first metadata identifier data
sending a first metadata request to for first payload metadata not included in the first message, wherein the first metadata request is sent to a metadata source indicated by the first metadata identifier data, and wherein the metadata source is executed at a message broker computing device that is remote from the at least one processor;
receiving from the metadata source, the first payload metadata describing the first payload data; and
identifying a first payload record from the first payload data, wherein the identifying is based at least in part on the first payload metadata.

* * * * *